(12) United States Patent
Dalipi et al.

(10) Patent No.: US 10,750,504 B2
(45) Date of Patent: Aug. 18, 2020

(54) NARROWBAND SERVICE DEPLOYMENT IN WIDEBAND CARRIER GUARD-BAND

(71) Applicant: Telefonaktiebolaget LM Ericsson (publ), Stockholm (SE)

(72) Inventors: Spendim Dalipi, Sollentuna (SE); Dominique Everaere, Åkersberga (SE); Asbjörn Grövlen, Stockholm (SE); Kenneth Sandberg, Ekerö (SE); Yutao Sui, Solna (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 165 days.

(21) Appl. No.: 16/074,329

(22) PCT Filed: Feb. 6, 2017

(86) PCT No.: PCT/SE2017/050103
§ 371 (c)(1),
(2) Date: Jul. 31, 2018

(87) PCT Pub. No.: WO2017/135885
PCT Pub. Date: Aug. 10, 2017

(65) Prior Publication Data
US 2019/0141705 A1    May 9, 2019

Related U.S. Application Data

(60) Provisional application No. 62/291,452, filed on Feb. 4, 2016.

(51) Int. Cl.
*H04W 72/04* (2009.01)
*H04L 5/00* (2006.01)
(Continued)

(52) U.S. Cl.
CPC ...... *H04W 72/0453* (2013.01); *H04B 7/2621* (2013.01); *H04L 5/003* (2013.01);
(Continued)

(58) Field of Classification Search
CPC ..... H04L 5/0007; H04L 5/003; H04L 5/0041; H04L 5/0048; H04L 5/1438; H04W 4/70;
(Continued)

(56) References Cited

U.S. PATENT DOCUMENTS 9,661,630 B2    5/2017   Arnott et al.
2017/0187488 A1*  6/2017   Rico Alvarino ...... H04L 5/0007
2017/0201393 A1*  7/2017   Gaal ..................... H04L 5/0048

FOREIGN PATENT DOCUMENTS

RU    2528020 C2     9/2014
WO    2015188848 A1  12/2015

OTHER PUBLICATIONS

Huawei, Analysis of Channel Raster Impact on NB-IoT, Nov. 2015, 3GPP, R1-156924 (Year: 2015).*
(Continued)

*Primary Examiner* — Harun Chowdhury
(74) *Attorney, Agent, or Firm* — Patent Portfolio Builders, PLLC (57) ABSTRACT

A wideband carrier (e.g., LTE carrier) is shifted up or down in frequency, within an allocated frequency band, by an integer multiple of the channel raster spacing (e.g., 100 KHz). This reduces the size of the guard band on one side of the carrier, and expands the guard band on the other side. A narrowband carrier (e.g., NB-IoT carrier) is then deployed within the expanded guard band, at or near a frequency such that the transmission is orthogonal to the wideband carrier transmissions, such as by using a shared N frequency grid spacing (e.g. at 100 KHz spacing, and using 15 KHz subcarriers). The narrowband carrier thus maintains
(Continued)

orthogonality with the wideband carrier, but has "room" within the expanded guard band to both transmit on a frequency close to the frequency grid spacing, and to boost transmit power (e.g., by 6 dB), while remaining within the spectral mask. The shifted wideband carrier is transparent to wideband UEs, as the frequency shift is an integer multiple of the channel raster spacing.

20 Claims, 7 Drawing Sheets (51) Int. Cl.
    H04L 29/08      (2006.01)
    H04B 7/26       (2006.01)
    H04L 5/14       (2006.01)
    H04W 52/14      (2009.01)
(52) U.S. Cl.
    CPC .......... *H04L 5/0041* (2013.01); *H04L 5/1438* (2013.01); *H04L 67/12* (2013.01); *H04W 52/146* (2013.01); *H04L 5/001* (2013.01); *H04L 5/0066* (2013.01)
(58) Field of Classification Search
    CPC . H04W 28/20; H04W 52/146; H04W 72/005; H04W 72/042; H04W 72/0453
    USPC .......... 370/252, 329, 330; 375/295; 455/450
    See application file for complete search history.

(56) References Cited

OTHER PUBLICATIONS

Qualcomm, Guard-band Operation Scenario Details, Oct. 2015, 3GPP, R1-155745 (Year: 2015).*

Huawei et al., "Discussion on Power Boosting In-Band and Guard-Band Operation for NB-IoT", 3GPP RAN WG4 Meeting #77 NB-IoT AH, Budapest, HU, Jan. 20, 2016, pp. 1, R4-77AH-IoT-0012, 3GPP.
RAN4, "Reply LS on power boosting in-band and guard-band operation for NB-IoT," Release 13, Work Item: NB_IOT-Core, 3GPP TSG-RAN4 Meeting #78, R4-16xxxx, pp. 1.
Ericsson, "NB-IoT Channel Raster," R1-160082, 3GPP TSG-RAN1 NB-IOT Ad Hoc, Jan. 18, 2016, Budapest, Hungary, pp. 1-3.
Huawei, et al., "Channel raster design," R1-160022, 3GPP TSG RAN WG1 NB-IoT Ad-Hoc Meeting, Agenda Item: 2.1.1.4, Budapest, Hungary, Jan. 18, 2016, pp. 1-5.
Ericsson, "NB-IoT-Sychronization Channel Evaluations," R1-160080, 3GPP TSG-RAN WG1 NB-IOT AdHoc, Agenda Iterm: 2.1.1.4, Jan. 18, 2016, pp. 1-6.
Huawei, et al., "Synchronization signal evaluation," R1-160021, 3GPP TSG-RAN WG1 NB-IOT AdHoc, Agenda Iterm: 2.1.1.4, Jan. 18, 2016, pp. 1-7.
Huawei, et al., "Revised Work Item: Narrowband IoT (NB-IoT)," RP-152284, 3GPP TSG RAN Meeting 370, Agenda Item: 11.7.17, Sitges, Spain, Dec. 7, 2015, pp. 1-9.
RAN4, "Reply LS on power boosting in-band and guard-band operation for NB-IoT," R4-77AH-IoT-0118, 3GPP TSG-RAN4 Meeting #77 NB-IOT AH, Budapest, Hungary, Jan. 20, 2016, pp. 1.
Huawei, et al., "Analysis of Channel Raster Impact on NB-IoT," R1-156924, 3GPP TSG RAN WG1 Meeting #83, Agenda Item: 6.2.6.2.2, Anaheim, CA, Nov. 15, 2015, pp. 1-5.
Huawei, "Discussion on power boosting in-band and guard-band operation for NB-IOT," R4-157633, 3GPP RAN WG4 Meeting #77, Agenda Item: 7.50.2, Anaheim, CA, Nov. 16, 2015, pp. 1-4.
Huawei, "On BS emission requirement in guard band operation for NB-IoT," R4-77AH-IoT-0017, 3GPP RAN WG4 Meeting #77 NB-IoT AH, Agenda Item: 3.5, Budapest, Hungary, Jan. 20, 2016, pp. 1-2.
Ericsson, "NB-IoT guard band operation for small LTE bandwidth," R4-162098, 3GPP TSG-RAN WG4 Meeting #78b, Agenda Item 6.13.4, San Jose del Cabo, Mexico, Apr. 11, 2016, pp. 1-3.
Nokia Networks, et al., "Guard-band operation for NB-IOT," R1-155981, 3GPP TSG-RAN WG1 Meeting #82bis, Malmo, Sweden, Agenda Item : 7.2.6.12, Oct. 5, 2015, pp. 1-3.

* cited by examiner

NARROWBAND SERVICE DEPLOYMENT IN WIDEBAND CARRIER GUARD-BAND

TECHNICAL FIELD

The present invention relates generally to wireless communication networks, and in particular to adjusting the frequency of a wideband carrier within an allocated frequency band to free spectrum for deployment of narrowband service in one guard band.

BACKGROUND

Cellular communication systems are currently being developed and improved for machine type communication (MTC). In MTC, communication is characterized by lower demands on data rates than, e.g., mobile broadband. However, MTC has higher requirements on characteristics such as low cost device design, better coverage, and ability to operate for years on batteries without charging or replacing the batteries. At 3GPP RAN #70 meeting, a new work item named Narrowband Internet of Things (NB-IoT) was approved. The objective is to specify a radio access for cellular internet of things that addresses improved indoor coverage, support for massive numbers of low throughput devices, low delay sensitivity, ultra-low device cost, low device power consumption and (optimized) network architecture, while also maintaining backward compatibility with the current Long Term Evolution (LTE) radio access technology.

Three modes of operation are defined for NB-IoT: stand-alone, guard-band, and in-band. In stand-alone mode, the NB-IoT system is operated in dedicated frequency bands. For in-band operation, the NB-IoT system can be placed inside the frequency bands used by the current LTE system. In guard-band mode, the NB-IoT system can be placed in the guard band used by the current LTE system—that is, the frequencies below and above an LTE carrier that are within the allocated frequency band spectral mask, but are not used by the LTE carrier.

The NB-IoT utilizes the smallest allocable bandwidth unit in LTE: a Physical Resource Block (PRB), defined as 12 subcarriers by one slot (0.5 msec). With 15 KHz subcarrier spacing, the NB-IoT has a bandwidth of 180 KHz. The channel raster of the NB-IoT systems (like that of LTE) is on a frequency grid of 100 KHz. That is, NB-IoT devices attempt to access NB-IoT carriers in a step size of 100 KHz. For the standalone deployment, this is fine—the carriers can be placed on 100 KHz multiples. For the in-band deployment, only some of the PRBs in the LTE carrier are candidates for NB-IoT transmission—those that fall close to the 100 KHz raster. Similarly, in the guard-band deployment, an NB-IoT carrier may have to be spaced apart from the LTE carrier (in frequency) to be at or near a multiple of 100 KHz. This is not a problem with the wideband LTE carriers, which have correspondingly wide guard bands.

To achieve the coverage requirement, the transmission power of NB-IoT signals must be higher than that of the LTE carrier, e.g., by 6 dB. This is fine for stand-alone and in-band deployments. However, for guard-band NB-IoT, particularly in the lower-bandwidth LTE carriers, the requirement of 100 KHz raster spacing may move the NB-IoT carrier so far away from the LTE carrier—that is, closer to the edge of the allocated frequency band—that the 6 dB power boosting would cause the NB-IoT carrier to violate the strict requirement of the spectral mask. Hence, guard-band deployment is not possible in some of the lower bandwidth LTE carriers.

The Background section of this document is provided to place embodiments of the present invention in technological and operational context, to assist those of skill in the art in understanding their scope and utility. Approaches descried in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, the LTE carrier is shifted up or down in frequency, within the allocated frequency band, by an integer multiple of the channel raster spacing (e.g., 100 KHz). This reduces the size of the guard band on one side of the carrier, and expands the guard band on the other side. An NB-IoT carrier is then deployed within the expanded guard band, at or near the 100 KHz spacing, and using 15 KHz subcarriers. Thus, the NB-IoT carrier maintains orthogonality with the LTE carrier, but has "room" within the expanded guard band to both locate properly in frequency, and to boost transmit power by, e.g., 6 dB, while remaining within the spectral mask. The shifted LTE carrier is transparent to LTE User Equipment (UE), as the LTE channel raster spacing is also 100 KHz. In FDD deployments, the uplink carrier is shifted in the same direction and by the same amount, thus preserving the duplex gap (again, being transparent to legacy LTE operation).

One embodiment relates to a method of providing a narrowband carrier in a guard band of a wideband carrier of a wireless communication network wherein the wideband carrier is transmitted within a spectral mask of an allocated frequency band such that guard bands, on which the wideband carrier does not transmit, occupy the frequencies above and below the wideband carrier and within the spectral mask. The method comprises transmitting the narrowband carrier in an expanded guard band at a frequency such that the transmission is orthogonal to the wideband carrier transmissions. The wideband carrier is transmitted at a frequency within the allocated frequency band that is shifted from its nominal position at or near the center of the frequency band, in one of a higher or lower frequency direction, by an integer multiple of a predetermined grid spacing, so as to reduce a guard band on one side of the wideband carrier and expand a guard band on the other side of the wideband carrier.

Another embodiment relates a method of accommodating a narrowband carrier in a guard band of a wideband carrier of a wireless communication system wherein the wideband carrier is transmitted within a spectral mask of an allocated frequency band such that guard bands, on which the wideband carrier does not transmit, occupy the frequencies above and below the wideband carrier and within the spectral mask. The method comprises transmitting the wideband carrier at a frequency within the allocated frequency band that is shifted from its nominal position at or near the center of the frequency band, in one of a higher or lower frequency direction, by an integer multiple of a predetermined grid spacing, so as to reduce a guard band on one side of the wideband carrier and expand a guard band on the other side of the wideband carrier. The narrowband carrier is transmitted in the expanded guard band at a frequency such that the transmission is orthogonal to the wideband carrier transmissions.

Still another embodiment relates to a base station operative in a wireless communication network wherein a wideband carrier is transmitted within a spectral mask of an allocated frequency band such that guard bands, on which the wideband carrier does not transmit, occupy the frequencies above and below the wideband carrier and within the spectral mask. The base station includes a transceiver and processing circuitry operatively connected to the transceiver and operative to cause the transceiver to transmit a narrowband carrier in an expanded guard band of the wideband carrier at a frequency such that the transmission is orthogonal to the wideband carrier transmissions. The wideband carrier is transmitted at a frequency within the allocated frequency band that is shifted from its nominal position at or near the center of the frequency band, in one of a higher or lower frequency direction, by an integer multiple of a predetermined grid spacing, so as to reduce a guard band on one side of the wideband carrier and expand a guard band on the other side of the wideband carrier.

Yet another embodiment relates to a base station operative in a wireless communication network wherein a wideband carrier is transmitted within a spectral mask of an allocated frequency band such that guard bands, on which the wideband carrier does not transmit, occupy the frequencies above and below the wideband carrier and within the spectral mask. The base station includes a transceiver and processing circuitry operatively connected to the transceiver and operative to cause the transceiver to transmit the wideband carrier at a frequency within the allocated frequency band that is shifted from its nominal position at or near the center of the frequency band, in one of a higher or lower frequency direction, by an integer multiple of a predetermined grid spacing, so as to reduce a guard band on one side of the wideband carrier and expand a guard band on the other side of the wideband carrier. The narrowband carrier is transmitted in an expanded guard band of the wideband carrier at a frequency such that the transmission is orthogonal to the wideband carrier transmissions.

Yet another embodiment relates to an apparatus operative in a wireless communication network wherein a wideband carrier is transmitted within a spectral mask of an allocated frequency band such that guard bands, on which the wideband carrier does not transmit, occupy the frequencies above and below the wideband carrier and within the spectral mask, and wherein a narrowband carrier is transmitted in an expanded guard band of the wideband carrier at a frequency such that the transmission is orthogonal to the wideband carrier transmissions. The apparatus includes a module operative to transmit the wideband carrier at a frequency within the allocated frequency band that is shifted from its nominal position at or near the center of the frequency band, in one of a higher or lower frequency direction, by an integer multiple of a predetermined grid spacing, so as to reduce a guard band on one side of the wideband carrier and expand a guard band on the other side of the wideband carrier.

Yet another embodiment relates to an apparatus operative in a wireless communication network wherein a wideband carrier is transmitted within a spectral mask of an allocated frequency band such that guard bands, on which the wideband carrier does not transmit, occupy the frequencies above and below the wideband carrier and within the spectral mask, and wherein the wideband carrier is transmitted at a frequency within the allocated frequency band that is shifted from its nominal position at or near the center of the frequency band, in one of a higher or lower frequency direction, by an integer multiple of a predetermined grid spacing, so as to reduce a guard band on one side of the wideband carrier and expand a guard band on the other side of the wideband carrier. The apparatus includes a module operative to transmit a narrowband carrier in an expanded guard band of the wideband carrier at a frequency such that the transmission is orthogonal to the wideband carrier transmissions.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

As discussed above, the channel raster of the NB-IoT systems (like that of LTE) is on a frequency grid of 100 KHz. That is, NB-IoT devices attempt to access NB-IoT carriers in a step size of 100 KHz. In a standalone deployment, the carriers can be placed exactly on 100 KHz multiples. However, for the in-band and guard-band operation, there is no PRB that falls directly on the cell search grid. This is due to the presence of the DC subcarrier, which is not transmitted, and the fact the center of a PRB is in between two subcarriers.

Figure 1:
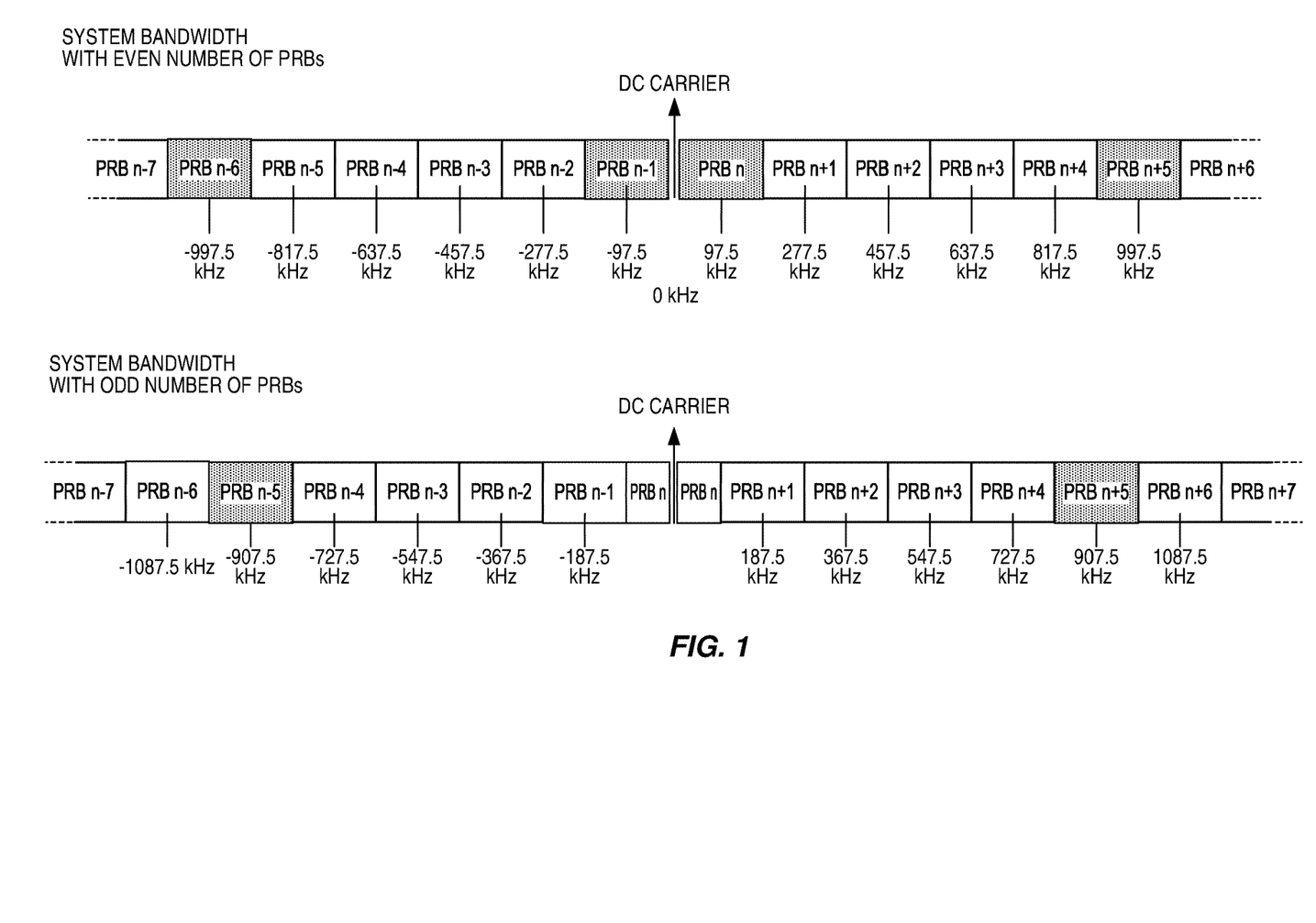
FIG. 1 is a frequency diagram showing LTE carrier frequency offsets for even and odd system bandwidths.

FIG. 1 depicts the frequency offsets from the DC subcarrier for both the cases of an even and an odd number of PRBs in the system bandwidth. For the case of even bandwidth, the DC carrier is between the two center PRBs. The frequency offset of the first PRB from the DC subcarrier is ±97.5 KHz (i.e., 6×15 KHz subcarriers+half of the DC subcarrier), which is ±2.5 KHz from 100 KHz. The next PRB close to the 100 KHz grid (indicated by shading in FIG. 1) is five away (5×180 KHz=900 KHz), but its actual frequency offset from the DC subcarrier is ±997.5, also ±2.5 KHz off. Note that in practice, the PRBs adjacent the DC subcarrier are not good candidates for NB-IoT, due to the LTE control channels and system overhead broadcast in those PRBs. For the case of odd bandwidth, the DC carrier splits the center PRB. The closest PRB to a grid spacing of 100 KHz is then n±5 (also shaded) at ±907.5 KHz (6×15 KHz+5×180 KHz), which is ±7.5 KHz offset from the desired grid spacing.

In NB-IoT receivers, algorithms can be designed such that the ±2.5 KHz or ±7.5 KHz offset can be handled by the device during the cell search process without degrading the synchronization performance considerably. However, larger offset values are more problematic, and the receiver may not be able to handle larger offsets. Therefore, the NB-IoT carriers are constrained to certain positions for the in-band and guard-band operations. Table 1 below depicts the PRB indices (starting from 0) for in-band deployment with the minimum frequency offset (only one side of the DC subcarrier is listed):

TABLE 1

PRB Indices for In-Band Deployment

| | LTE system bandwidth | | | | |
|---|---|---|---|---|---|
| | 3 MHz | 5 MHz | 10 MHz | 15 MHz | 20 MHz |
| PRB indices with 2.5 KHz offset | | | 4, 9, 14, 19, 30, 35, 40, 45 | | 4, 9, 14, 19, 24, 29, 34, 39, 44, 55, 60, 65, 70, 75, 80, 85, 90, 95 |
| PRB indices with 7.5 KHz offset | 2, 12 | 2, 7, 17, 22 | | 2, 7, 12, 17, 22, 27, 32, 42, 47, 52, 57, 62, 67, 72 | |

For the guard-band deployment, for an LTE system with 10 or 20 MHz system bandwidth it is possible to place an NB-IoT carrier frequency adjacent to the LTE carrier—that is, occupying the "next" 12 subcarriers—and achieve a ±2.5 KHz offset from the 100 KHz frequency raster. However, for other LTE system bandwidths, using the most adjacent PRB, the offset to the 100 KHz raster is 52.5 KHz. Therefore, in order to get within the same ±7.5 KHz to the 100 KHz grid, the NB-IoT must be separated from the LTE carrier by three subcarriers. The LTE subcarrier spacing of 15 KHz is necessary for these separation subcarriers, to place them in the same FFT grid as the legacy LTE carrier, thus maintaining orthogonality and hence minimizing interference. Table 2 below depicts the frequencies of adjacent PRBs, the frequency offsets from the 100 KHz grid, the number of spacing subcarriers needed to achieve ±7.5 KHz offset, and the frequencies of the PRBs when separated from the LTE carrier by subcarriers (note: the 1.3 MHz bandwidth is not included as guard-band mode NB-IoT is not deemed feasible there):

TABLE 2

PRB Spacing Requirements for Guard-Band Deployment

| System bandwidth [MHz] | PRBs in system bandwidth | Guard band PRB center frequency offset [KHz] | Offset to 100 KHz grid | Guard sub-carriers needed to be with ±7.5 KHz of 100 KHz | Guard band PRB center frequency offset when including guard sub-carriers [KHz] |
|---|---|---|---|---|---|
| 3 | 15 | 1447.5 | 52.5 | 3 | 1492.5 |
| 5 | 25 | 2347.5 | 52.5 | 3 | 2392.5 |
| 10 | 50 | 4597.5 | 2.5 | 0 | 4597.5 |
| 15 | 75 | 6847.5 | 52.5 | 3 | 6892.5 |
| 20 | 100 | 9097.5 | 2.5 | 0 | 9097.5 |

Table 3 below depicts the possible center frequencies (offset from DC subcarrier) for NB-IoT deployment in guard-band mode, with the three subcarriers included where necessary:

TABLE 3

PRB Frequency Offsets for Guard-Band Deployment

| | LTE system bandwidth | | | |
|---|---|---|---|---|
| | 5 MHz | 10 MHz | 15 MHz | 20 MHz |
| NB-IoT carrier center frequency closest to 100 KHz channel raster (KHz from LTE center) | ±2392.5 | ± 4597.5 4702.5 4807.5 4897.5 | ± 6892.5 6997.5 7102.5 7207.5 7297.5 7402.5 | ± 9097.5 9202.5 9307.5 9397.5 9502.5 9607.5 9697.5 9802.5 9907.5 |

For further discussion of the channel raster and frequency offset problems, see R1-160082, NB-IoT Channel Raster, 3GPP TSG-RAN1 NB-IOT Ad Hoc 18-20 Jan. 2016, Budapest, Hungary; and R1-160022, Channel raster design, 3GPP TSG-RAN1 NB-IOT Ad Hoc 18-20 Jan. 2016, Budapest, Hungary. For further discussion of the cell search process and ways to overcome the ±2.5 KHz and ±7.5 KHz frequency offsets, see R1-160080, NB-IoT—Synchronization Channel Evaluations, 3GPP TSG-RAN1 NB-IOT Ad Hoc 18-20 Jan. 2016, Budapest, Hungary; and R1-160021, Synchronization signal evaluation, 3GPP TSG-RAN1 NB-IOT Ad Hoc 18-20 Jan. 2016, Budapest, Hungary.

In order to achieve the coverage requirements of the NB-IoT systems, compared to the average LTE data channel transmit power, at least 6 dB power boosting is needed for the in-band and guard-band deployment. See R4-77AH-IoT-0118, Reply LS on power boosting in-band and guard-band operation for NB-IoT, 3GPP TSG-RAN4 Meeting #77 NB-IOT AH, Budapest. However, due to spectrum restrictions, this 6 dB power boosting cannot be applied at arbitrary places in the guard band. To be more specific, as is stated in the above cited reference, the "Feasibility of boosting for transmission in the guard band depends on the system bandwidth, spacing between NB-IOT and LTE, and also the amount of boosting. When NB-IOT is not very close to the edge of the system bandwidth and with proper design of base station equipments, power boosting of up to 6 dB would be feasible."

Figure 2:
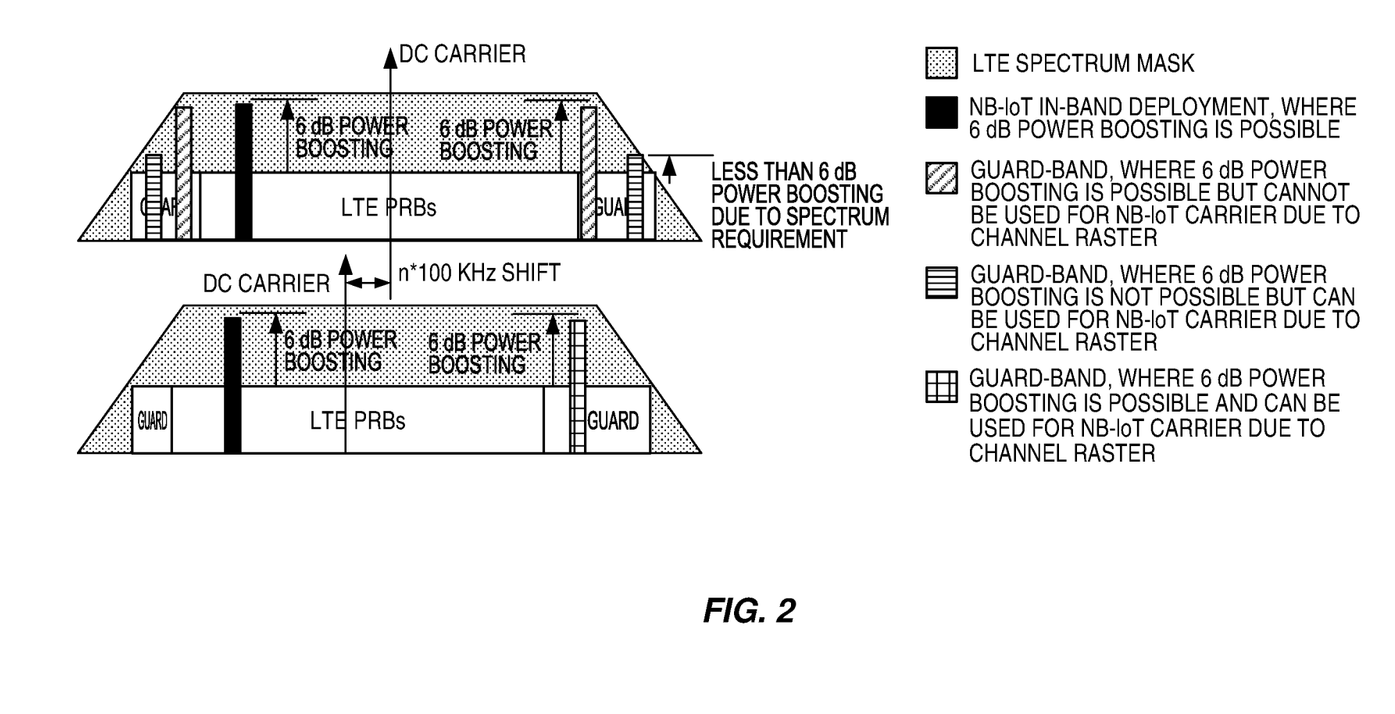
FIG. 2 is a frequency diagram showing the spectral mask of an LTE wideband carrier.

FIG. 2 illustrates this constraint. The size of the guard band in an LTE system is proportional to the system bandwidth. For an LTE system with 10 MHz bandwidth, several positions in the guard band can be used for the NB-IoT carriers, i.e., ±4597.5, 4702.5, 4807.5, and 4897.5 KHz from the DC subcarrier (see Table 3 above). As Table 3 also shows, for a system with smaller bandwidth, e.g., 5 MHz LTE system, only one position at each side in the guard band, i.e., 2392.5 KHz or −2392.5 KHz from the DC subcarrier, can be used for the NB-IoT carrier. However, these two positions are very close to the edge of the allocated frequency band, where stringent LTE spectrum mask requirements apply. As the upper diagram in FIG. 2 depicts, in this case either the NB-IoT carrier cannot be boosted by 6 dB, or a strict channel filter must be applied. Both solutions results in degradation of the performance of the NB-IoT system.

The lower diagram in FIG. 2 illustrates one solution according to embodiments of the present invention. The entire LTE carrier is shifted, within the allocated frequency band, by an integer multiple of 100 KHz. This reduces the size of the guard band on one side of the carrier, and expands the size of the guard band on the other side. The shift—depicted as downward in FIG. 2—may be in either direction.

The expanded guard band now offers more options for placing a NB-IoT carrier within a ±7.5 KHz offset from the frequency grid spacing of 100 KHz, while remaining far enough from the edge of the allocated frequency band to boost transmit power by 6 dB without violating the spectral mask requirements. Since usually only one of the two available guard bands is used for NB-IoT system deployment, this solution has no impact on the system capacity. Additionally, since the LTE channel raster is also 100 KHz, such a shift is transparent to the legacy LTE UEs.

In Frequency Division Duplex (FDD) systems, the uplink carrier is similarly shifted, by the same 100 KHz multiple, and in the same direction. NB-IoT reception then occurs near a 100 KHz multiple, in the expanded guard band. This preserves the duplex band gap, again making the shift transparent to legacy equipment. Preserving the duplex carrier symmetry additionally results in better rejection of adjacent channel energy, and gives better carrier-to-interference (C/I) performance. Furthermore, this also facilitates the UL receiver RF filter design, as it eases the design of an UL receiver RF filter that gives the same sensitivity to all the sub-carriers, even the ones at the band edge for NB-IoT. Moreover, this also facilitates the baseband processing.

Embodiments of the present invention are fully applicable to Time Division Duplex (TDD) systems. In TDD systems, the operative carrier frequency is shifted as described to expand one guard band for NB-IoT deployment, with uplink-downlink time slots being allocated and utilized according to the operative standards and protocols.

Figure 3:
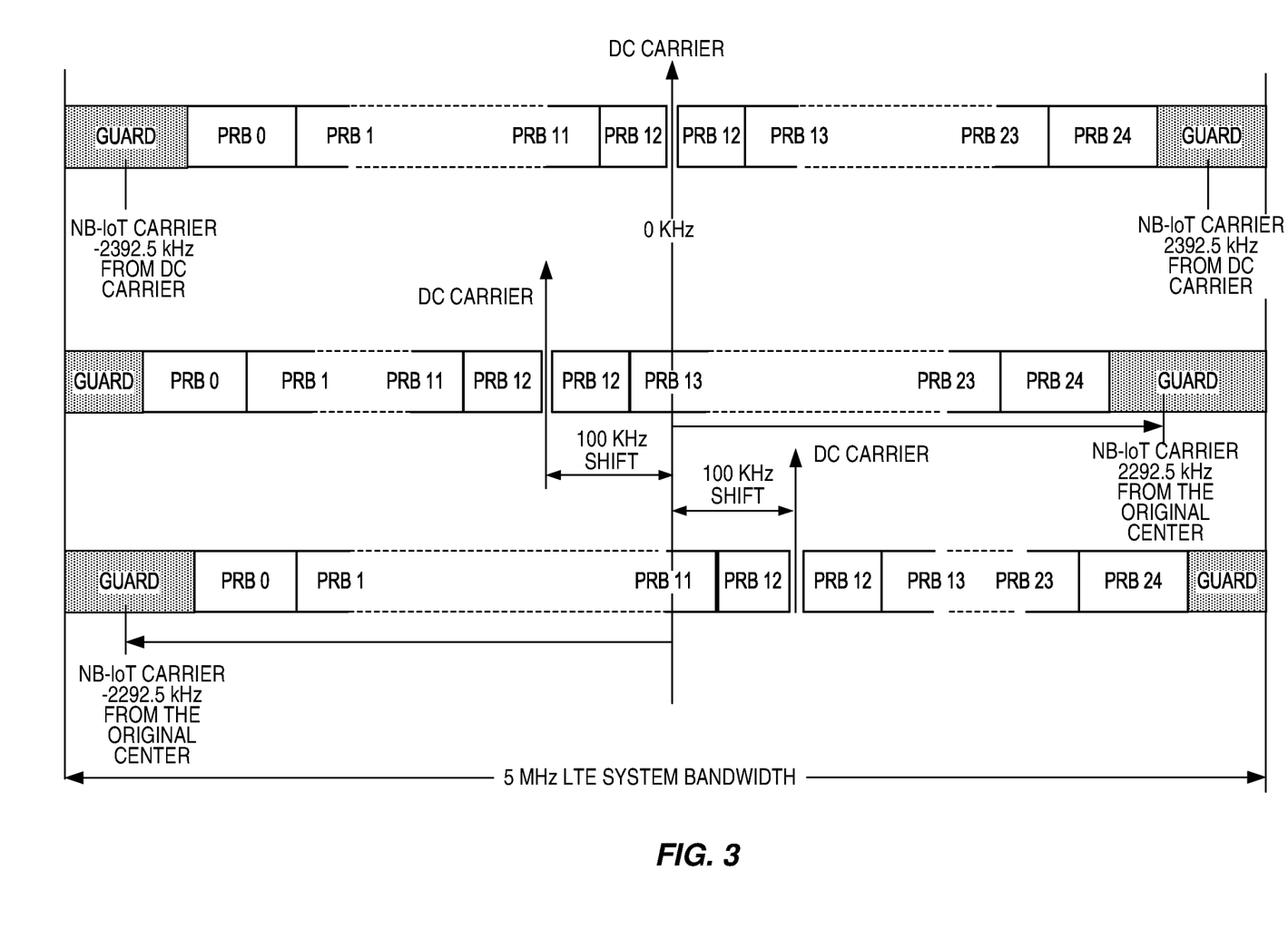
FIG. 3 is a frequency diagram showing an LTE wideband carrier shifted both up and down by 100 KHz.

FIG. 3 depicts an example of the 5 MHz LTE carrier case, where only 100 KHz shifting of the LTE carrier is possible. The upper diagram depicts a conventional 5 MHz LTE carrier, centered within the allocated spectral mask. The middle diagram depicts the 5 MHz LTE carrier shifted downwardly by 100 KHz, and the lower diagram depicts the 5 MHz LTE carrier shifted upwardly by 100 KHz. Although the 5 MHz carrier case is limited to a single 100 KHz carrier shift, embodiments of the present invention can be extended to other LTE system bandwidth, e.g., 10 MHz, 15 MHz, and 20 MHz, where multiple 100 KHz shifting is possible.

Figure 4:
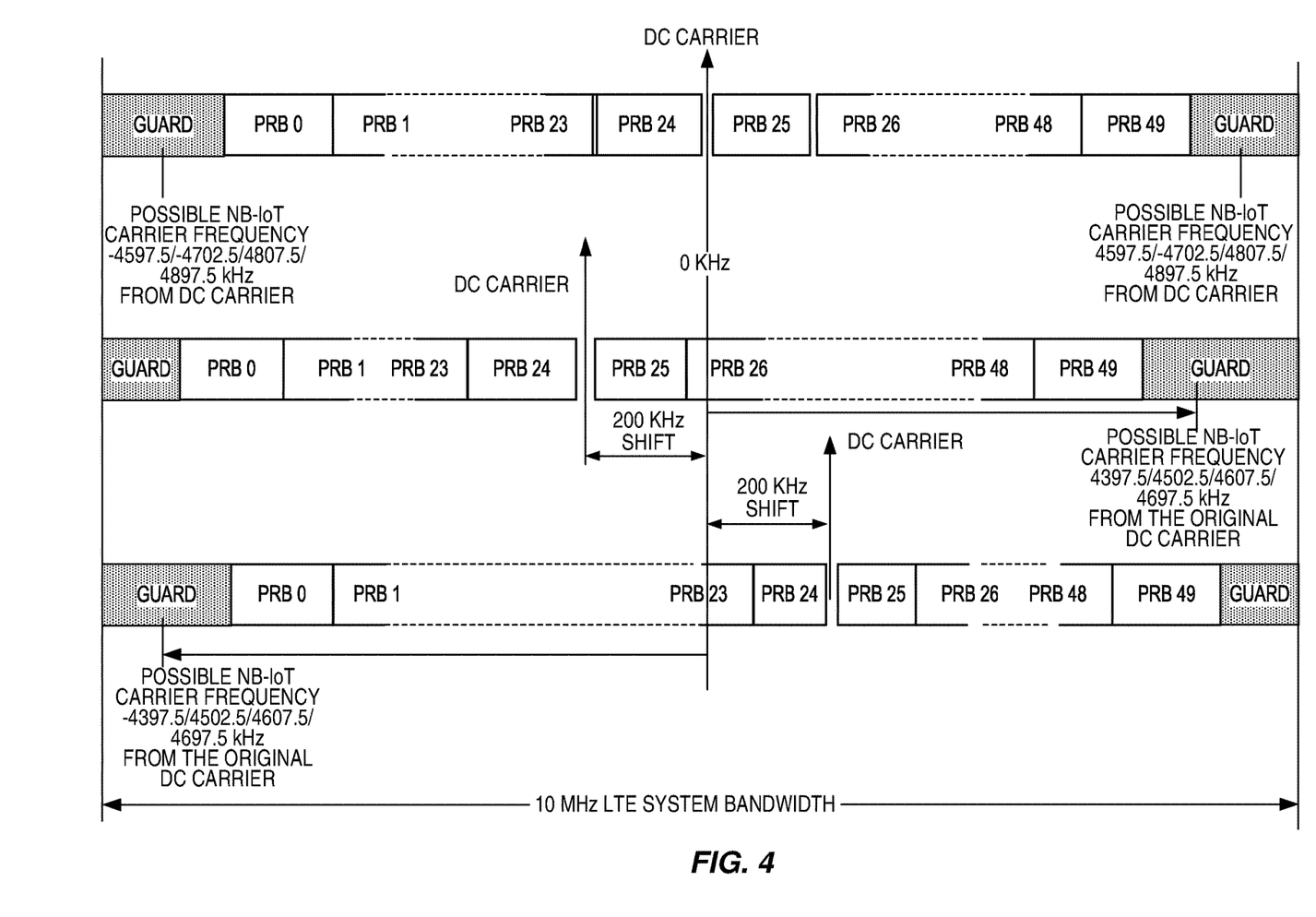
FIG. 4 is a frequency diagram showing an LTE wideband carrier shifted both up and down by 200 KHz.

FIG. 4 depicts a 10 MHz LTE system bandwidth shifted by 200 KHz. Other shifts of various multiples of 100 KHz, within LTE systems of various bandwidths, are of course possible, and will readily occur to those of skill in the art, given the teaching of the present disclosure. Accordingly, only the specific examples of FIGS. 3 and 4 are depicted, although the invention is not limited to these examples.

Figure 5:
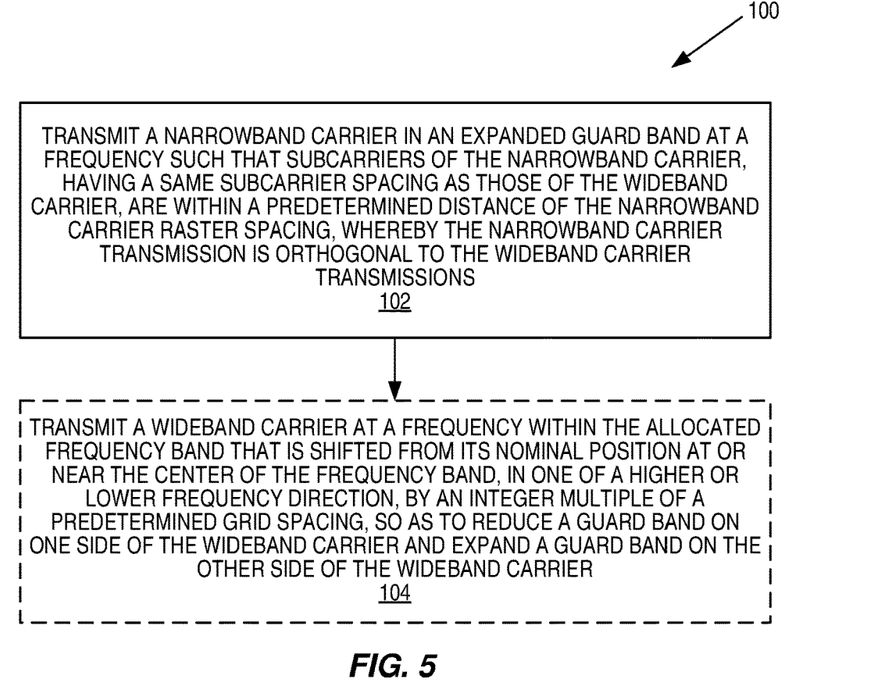
FIG. 5 is a flow diagram of a method of providing a narrowband carrier in an expanded guard band of a shifted wideband carrier.

FIG. 5 depicts the steps of a method 100 of providing a narrowband carrier in a guard band of a wideband carrier of a wireless communication network. The wideband carrier is transmitted within a spectral mask of an allocated frequency band such that guard bands, on which the wideband carrier does not transmit, occupy the frequencies above and below the wideband carrier and within the spectral mask. The narrowband carrier is transmitted (block 102) in an expanded guard band at a frequency such that the transmission is orthogonal to the wideband carrier transmissions. The wideband carrier is transmitted (block 104)—by the same or possibly by another base station, as indicated by the dashed-line block—at a frequency within the allocated frequency band that is shifted from its nominal position at or near the center of the frequency band. The frequency shift is in one of a higher or lower frequency direction. The wideband carrier is shifted by an integer multiple of a predetermined grid spacing, so as to reduce a guard band on one side of the wideband carrier and expand a guard band on the other side of the wideband carrier.

Figure 6:
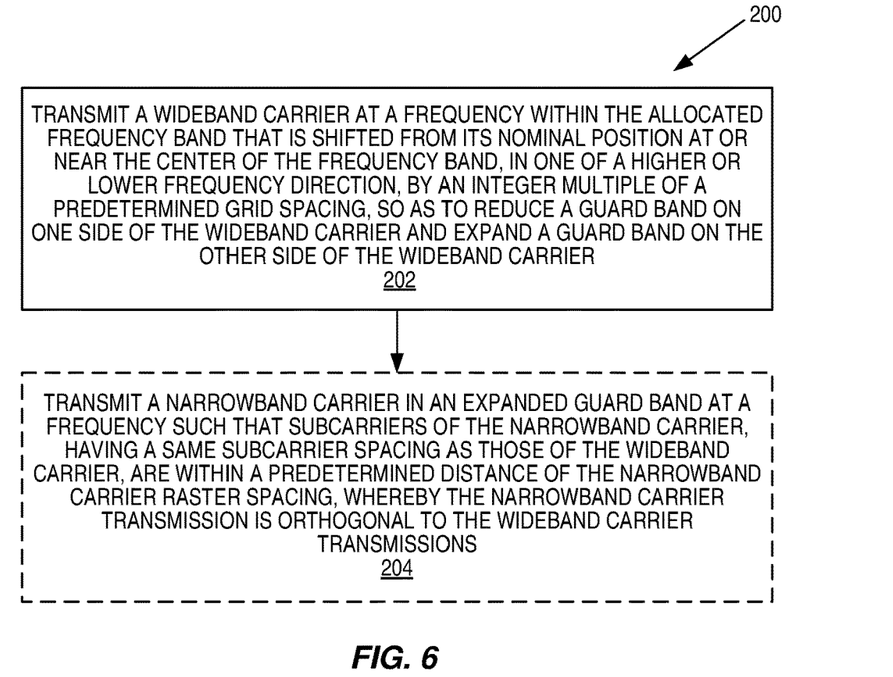
FIG. 6 is a flow diagram of a method of transmitting a shifted wideband carrier to accommodate a narrowband carrier in an expanded guard band.

FIG. 6 depicts the steps of a method 200 of accommodating a narrowband carrier in a guard band of a wideband carrier of a wireless communication network. The wideband carrier is transmitted within a spectral mask of an allocated frequency band such that guard bands, on which the wideband carrier does not transmit, occupy the frequencies above and below the wideband carrier and within the spectral mask. The wideband carrier is transmitted (block 202) at a frequency within the allocated frequency band that is shifted from its nominal position at or near the center of the frequency band. The frequency shift is in one of a higher or lower frequency direction. The wideband carrier is shifted by an integer multiple of a predetermined grid spacing, so as to reduce a guard band on one side of the wideband carrier and expand a guard band on the other side of the wideband carrier. The narrowband carrier is transmitted (block 204)—by the same or possibly by another base station, as indicated by the dashed-line block—in the expanded guard band at a frequency such that the transmission is orthogonal to the wideband carrier transmissions.

Figure 7:
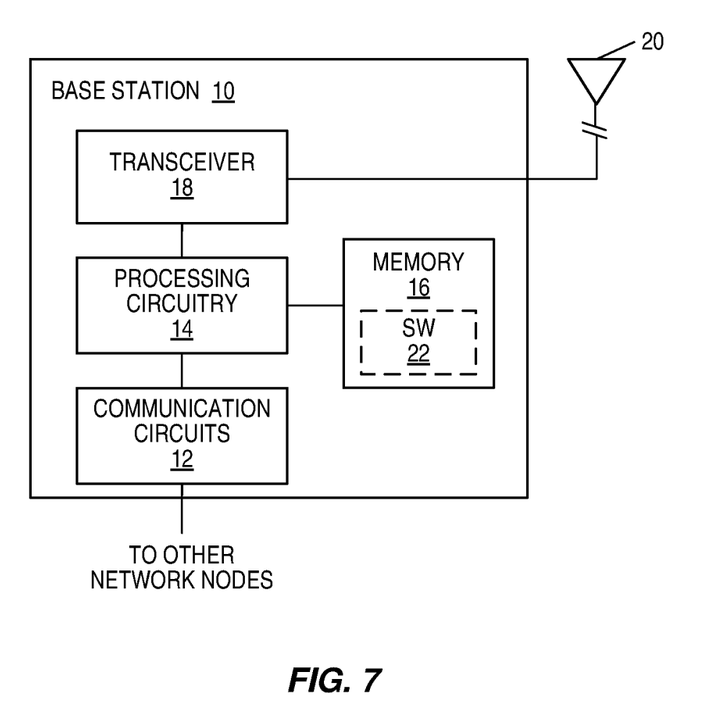
FIG. 7 is a functional block diagram of a base station.

FIG. 7 depicts a base station operative in a wireless communication network deploying wideband carriers such as LTE and narrowband carriers such as NB-IoT. As those of skill in the art are aware, a base station 10 is a network node providing wireless communication services to one or more User Equipment (UE) in a geographic region (known as a cell or sector). The base station 10 in LTE is called an e-NodeB or eNB; however the present invention is not limited to LTE or eNBs. A base station 10 includes communication circuits 12 operative to exchange data with other network nodes; processing circuitry 14; memory 16; and radio circuits, such as a transceiver 18, one or more antennas 20, and the like, to effect wireless communication across an air interface to one or more UE. As those of skill in the art are aware, and as indicated by the continuation lines in the antenna feed line of FIG. 7, the antenna(s) 20 may be physically located separately from the network node 10, such as mounted on a tower, building, or the like. Although the memory 16 is depicted as being separate from the processing circuitry 14, those of skill in the art understand that the processing circuitry 14 includes internal memory, such as a cache memory or register files. Those of skill in the art additionally understand that virtualization techniques allow some functions nominally executed by the processing circuitry 14 to actually be executed by other hardware, perhaps remotely located (e.g., in the so-called "cloud").

According to embodiments of the present invention, the memory 16 is operative to store, and the processing circuitry 14 operative to execute, software 22 which when executed is operative to cause the base station 10 to transmit, as described herein, one or both of:

a wideband carrier shifted from its nominal position at the center of an allocated frequency band, by an integer multiple of a predetermined grid spacing, so as to reduce a guard band on one side of the wideband carrier and expand a guard band on the other side of the wideband carrier; and a narrowband carrier in the expanded guard band, preferably at a frequency such that the transmission is orthogonal to the wideband carrier transmissions.

The processing circuitry 14 may comprise any one or more sequential state machines operative to execute machine instructions stored as machine-readable computer programs in the memory 16, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP); or any combination of the above.

The memory 16 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The radio circuits may comprise one or more transceivers 18 used to communicate with one or more other transceivers via a Radio Access Network (RAN) according to one or more communication protocols known in the art or that may be developed, such as IEEE 802.xx, CDMA, WCDMA, GSM, UTRAN, LTE, NR, LTE-M, NB-IoT, WiMax, or the like. The transceiver 18 implements transmitter and receiver functionality appropriate to the Radio Access Network links (e.g., frequency allocations and the like). The transmitter and receiver functions may share circuit components and/or software, or alternatively may be implemented separately.

The communication circuits 12 may comprise a receiver and transmitter interface used to communicate with one or more other nodes over a communication network according to one or more communication protocols known in the art or that may be developed, such as Ethernet, TCP/IP, SONET, ATM, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Figure 8:
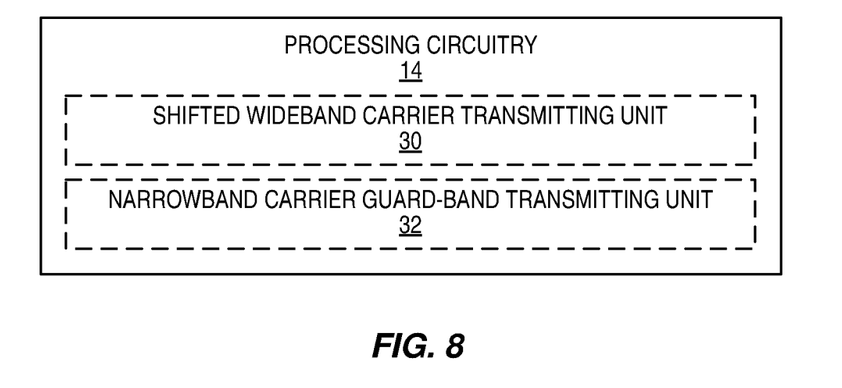
FIG. 8 is a diagram of physical units in processing circuitry in the base station of FIG. 7.

FIG. 8 illustrates example processing circuitry 14, such as that in the network node 10 of FIG. 7. The processing circuitry 14 may comprise one or more physical units. In particular, the processing circuitry 14 may comprise a shifted wideband carrier transmitting unit 30 and/or a narrowband carrier transmitting unit 32. The shifted wideband carrier transmitting unit 30 is configured to transmit a wideband carrier shifted from its nominal position at the center of an allocated frequency band, by an integer multiple of a predetermined grid spacing, so as to reduce a guard band on one side of the wideband carrier and expand a guard band on the other side of the wideband carrier. The narrowband carrier transmitting unit 32 is configured to transmit a narrowband carrier in the expanded guard band, preferably at a frequency such that the transmission is orthogonal to the wideband carrier transmissions.

Figure 9:
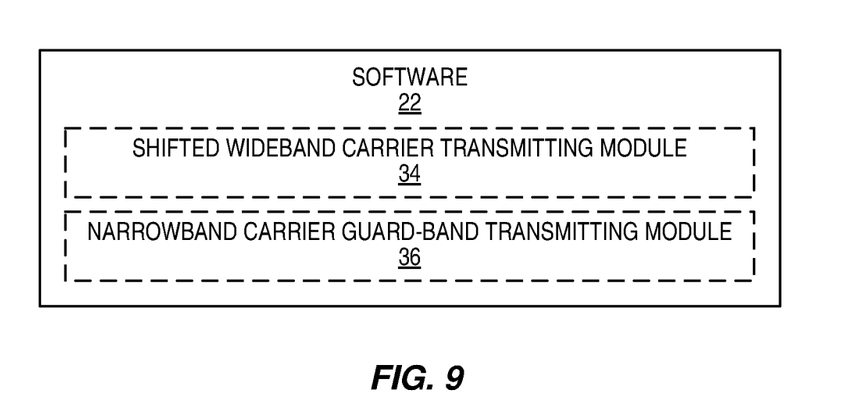
FIG. 9 is a diagram of software modules in memory in the base station of FIG. 7.

FIG. 9 illustrates example software 22, such as that in the memory 16 of the network node 10 of FIG. 7. The software 22 may comprise one or more software modules. In particular, the software 22 may comprise a shifted wideband carrier transmitting module 34 and/or a narrowband carrier transmitting module 36. The shifted wideband carrier transmitting module 34 is configured to transmit a wideband carrier shifted from its nominal position at the center of an allocated frequency band, by an integer multiple of a predetermined grid spacing, so as to reduce a guard band on one side of the wideband carrier and expand a guard band on the other side of the wideband carrier. The narrowband carrier transmitting module 36 is configured to transmit a narrowband carrier in the expanded guard band, preferably at a frequency such that the transmission is orthogonal to the wideband carrier transmissions.

Figure 10:
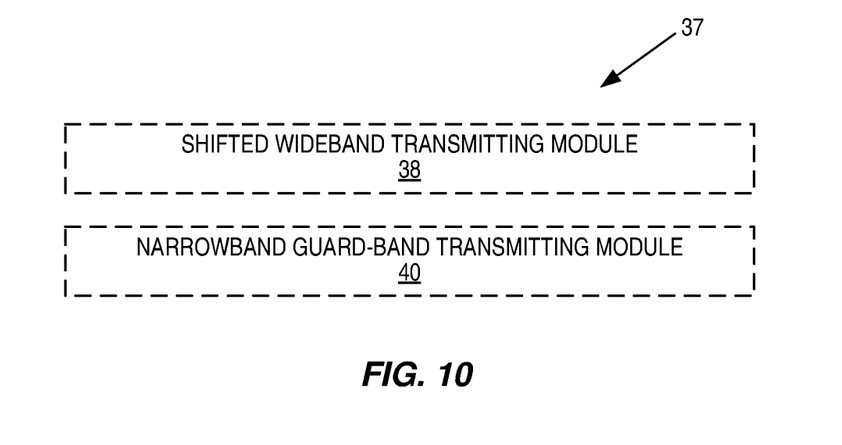
FIG. 10 is a diagram of modules comprising a virtual function module architecture of an apparatus.

FIG. 10 illustrates modules, one or both of which may comprise a virtual function module architecture of an apparatus operative to transmit or accommodate a narrowband carrier in an expanded guard band of a shifted wideband carrier. A first module 38 is configured to transmit a wideband carrier shifted from its nominal position at the center of an allocated frequency band, by an integer multiple of a predetermined grid spacing, so as to reduce a guard band on one side of the wideband carrier and expand a guard band on the other side of the wideband carrier. A second module 40 is configured to transmit a narrowband carrier in the expanded guard band, preferably at a frequency such that the transmission is orthogonal to the wideband carrier transmissions.

Although described herein in the context of an LTE system deploying guard-band mode NB-IoT carriers, embodiments of the present invention are not limited to this context. In general, any wideband carrier deployed in an allocated frequency band with guard bands to either side may be transmitted at a shifted frequency to expand one guard band at the expense of the other. Deployment of a narrowband carrier in the expanded guard band—by the same base station transmitting the shifted wideband carrier or by another network node—may find greater degrees of freedom in selection of an appropriate frequency, and in the allowable boosted transmission power. The narrowband carrier is preferably deployed so as to be orthogonal with the wideband carrier, and to otherwise minimize interference therewith.

As used herein a wideband carrier transmitted on a "shifted" frequency means one that is transmitted, perhaps in the first instance, at a frequency that is shifted from a nominal, usual, specified, or otherwise "expected" frequency. It is not required that the carrier be actually transmitted at a first frequency and subsequently transmitted at a second frequency, for the carrier to have been "shifted" in transmission frequency.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of providing a narrowband carrier in a guard band of a wideband carrier of a wireless communication network wherein the wideband carrier is transmitted within a spectral mask of an allocated frequency band such that guard bands, on which the wideband carrier does not transmit, occupy frequencies above and below the wideband carrier and within the spectral mask, the method comprising:
transmitting the narrowband carrier in an expanded guard band at a frequency such that subcarriers of the narrowband carrier, having a same subcarrier spacing as those of the wideband carrier, are within a predetermined distance of the narrowband carrier raster spacing, whereby the narrowband carrier transmission is orthogonal to the wideband carrier transmissions,
wherein the wideband carrier is transmitted at a frequency within the allocated frequency band that is shifted from its nominal position at or near the center of the allocated frequency band, in one of a higher or lower frequency direction, by an integer multiple of a predetermined grid spacing, so as to reduce a guard band on one side of the wideband carrier and expand a guard band on the other side of the wideband carrier.

2. The method of claim 1, wherein the predetermined grid spacing is a frequency grid spacing of the wideband carrier, whereby the frequency shift is transparent to a User Equipment accessing the wideband carrier.

3. The method of claim 1, wherein the predetermined distance of the narrowband subcarriers from the narrowband carrier raster spacing is one of +/−2.5 KHz and +/−7.5 KHz.

4. The method of claim 1, wherein transmitting the narrowband carrier in the expanded guard band comprises transmitting the narrowband carrier in the expanded guard band at a higher power than transmission of downlink traffic on the wideband carrier.

5. The method of claim 4, wherein transmitting the narrowband carrier in the expanded guard band at the higher power than the transmission of downlink traffic on the wideband carrier comprises transmitting the narrowband carrier in the expanded guard band at 6dB higher power than the transmission of downlink traffic on the wideband carrier.

6. The method of claim 1, wherein the wireless communication network employs frequency division duplex, and the method further comprising:
receiving the narrowband carrier in the expanded guard band at the frequency such that the subcarriers of the narrowband carrier, having the same subcarrier spacing as those of the wideband carrier, are within +/−7.5 KHz of the narrowband carrier raster spacing, whereby the narrowband carrier transmission is orthogonal to the wideband carrier transmissions,
wherein the wideband carrier is received at the frequency within the allocated frequency band that is shifted from its nominal position at or near the center of the allocated frequency band, in one of the higher or lower frequency direction, by the integer multiple of the predetermined grid spacing, so as to reduce the guard band on one side of the wideband carrier and expand the guard band on the other side of the wideband carrier.

7. A method of accommodating a narrowband carrier in a guard band of a wideband carrier of a wireless communication system, wherein the wideband carrier is transmitted within a spectral mask of an allocated frequency band such that guard bands, on which the wideband carrier does not transmit, occupy frequencies above and below the wideband carrier and within the spectral mask, the method comprising:
transmitting the wideband carrier at a frequency within the allocated frequency band that is shifted from its nominal position at or near the center of the allocated frequency band, in one of a higher or lower frequency direction, by an integer multiple of a predetermined grid spacing, so as to reduce a guard band on one side of the wideband carrier and expand a guard band on the other side of the wideband carrier,
wherein the narrowband carrier is transmitted in an expanded guard band at a frequency such that subcarriers of the narrowband carrier, having a same subcarrier spacing as those of the wideband carrier, are within a predetermined distance of the narrowband carrier raster spacing, whereby the narrowband carrier transmission is orthogonal to the wideband carrier transmissions.

8. The method of claim 7, wherein the predetermined grid spacing is a frequency grid spacing of the wideband carrier, whereby the frequency shift is transparent to a User Equipment accessing the wideband carrier.

9. The method of claim 8, wherein the predetermined grid spacing is 100 KHz.

10. The method of claim 7, wherein the predetermined distance of the narrowband subcarriers from the narrowband carrier raster spacing is one of +/− 2.5 KHz and +/− 7.5 KHz.

11. The method of claim 7, wherein the wireless communication network employs frequency division duplex, and the method further comprising:
receiving the wideband carrier at the frequency within the allocated frequency band that is shifted from its nominal position at or near the center of the allocated frequency band, in one of the higher or lower frequency direction, by the integer multiple of the predetermined grid spacing, so as to reduce the guard band on one side of the wideband carrier and expand the guard band on the other side of the wideband carrier,
wherein the narrowband carrier is received in the expanded guard band at the frequency such that the subcarriers of the narrowband carrier, having the same subcarrier spacing as those of the wideband carrier, are within +/− 7.5 KHz of the narrowband carrier raster spacing, whereby the narrowband carrier transmission is orthogonal to the wideband carrier transmissions.

12. A base station operative in a wireless communication network wherein a wideband carrier is transmitted within a spectral mask of an allocated frequency band such that guard bands, on which the wideband carrier does not transmit, occupy frequencies above and below the wideband carrier and within the spectral mask, the base station comprising:
a transceiver; and
processing circuitry operatively connected to the transceiver and operative to cause the transceiver to transmit a narrowband carrier in an expanded guard band at a frequency such that subcarriers of the narrowband carrier, having a same subcarrier spacing as those of the wideband carrier, are within a predetermined distance of the narrowband carrier raster spacing, whereby the narrowband carrier transmission is orthogonal to the wideband carrier transmissions,
wherein the wideband carrier is transmitted at a frequency within the allocated frequency band that is shifted from its nominal position at or near the center of the allocated frequency band, in one of a higher or lower frequency direction, by an integer multiple of a predetermined grid spacing, so as to reduce a guard band on one side of the wideband carrier and expand a guard band on the other side of the wideband carrier.

13. The base station of claim 12, wherein the predetermined grid spacing is a frequency grid spacing of the wideband carrier, whereby the frequency shift is transparent to a User Equipment accessing the wideband carrier.

14. The base station of claim 12, wherein the predetermined distance of the narrowband subcarriers from the narrowband carrier raster spacing is one of +/− 2.5 KHz and +/− 7.5 KHz.

15. The base station of claim 12, wherein the processing circuitry is operative to transmit the narrowband carrier in the expanded guard band by transmitting the narrowband carrier in the expanded guard band at a higher power than transmission of downlink traffic on the wideband carrier.

16. The base station of claim 12, wherein the wireless communication network employs frequency division duplex, wherein the processing circuitry is further operative to cause the transceiver to receive the narrowband carrier in the expanded guard band of the wideband carrier at the frequency such that the received transmissions are orthogonal to the wideband carrier transmissions, and
wherein the wideband carrier is received at the frequency within the allocated frequency band that is shifted from its nominal position at or near the center of the frequency band, in one of the higher or lower frequency direction, by the integer multiple of the predetermined grid spacing, so as to reduce the guard band on one side of the wideband carrier and expand the guard band on the other side of the wideband carrier.

17. A base station operative in a wireless communication network wherein a wideband carrier is transmitted within a spectral mask of an allocated frequency band such that guard bands, on which the wideband carrier does not transmit, occupy frequencies above and below the wideband carrier and within the spectral mask, the base station comprising:
a transceiver; and
processing circuitry operatively connected to the transceiver and operative to cause the transceiver to transmit the wideband carrier at a frequency within the allocated frequency band that is shifted from its nominal position at or near the center of the allocated frequency band, in one of a higher or lower frequency direction, by an integer multiple of a predetermined grid spacing, so as to reduce a guard band on one side of the wideband carrier and expand a guard band on the other side of the wideband carrier,
wherein a narrowband carrier is transmitted in an expanded guard band at a frequency such that subcarriers of the narrowband carrier, having a same subcarrier spacing as those of the wideband carrier, are within a predetermined distance of the narrowband carrier raster spacing, whereby the narrowband carrier transmission is orthogonal to the wideband carrier transmissions.

18. The base station of claim 17, wherein the predetermined grid spacing is a frequency grid spacing of the wideband carrier, whereby the frequency shift is transparent to a User Equipment accessing the wideband carrier.

19. The base station of claim 18, wherein the predetermined grid spacing is 100 KHz.

20. The base station of claim 17, wherein the wireless communication network employs frequency division duplex, wherein the processing circuitry is further operative to cause the transceiver to receive the wideband carrier at the frequency within the allocated frequency band that is shifted from its nominal position at or near the center of the allocated frequency band, in one of the higher or lower frequency direction, by the integer multiple of the predetermined grid spacing, so as to reduce the guard band on one side of the wideband carrier and expand the guard band on the other side of the wideband carrier, and wherein the narrowband carrier is received in the expanded guard band at the frequency such that the subcarriers of the narrowband carrier, having the same subcarrier spacing as those of the wideband carrier, are within +/− 7.5 KHz of the narrowband carrier raster spacing, whereby the narrowband carrier transmission is orthogonal to the wideband carrier transmissions.

* * * * *